(12) United States Patent
Werner et al.

(10) Patent No.: US 8,060,544 B2
(45) Date of Patent: Nov. 15, 2011

(54) REPRESENTATION OF DATA TRANSFORMATION PROCESSES FOR PARALLELIZATION

(75) Inventors: Horst Werner, Muehlhausen-Rettigheim (DE); Christof Bornhoevd, Belmont, CA (US)

(73) Assignee: SAP AG, Walldorf (DE)

( * ) Notice: Subject to any disclaimer, the term of this patent is extended or adjusted under 35 U.S.C. 154(b) by 953 days.

(21) Appl. No.: 12/026,943

(22) Filed: Feb. 6, 2008

(65) Prior Publication Data

US 2009/0198756 A1 Aug. 6, 2009

(51) Int. Cl.
*G06F 9/44* (2006.01)
(52) U.S. Cl. ....................................... 708/200
(58) Field of Classification Search ........... 708/200–209
See application file for complete search history.

(56) References Cited

U.S. PATENT DOCUMENTS

| | | | |
|---|---|---|---|
| 7,395,529 B1* | 7/2008 | Stanton et al. | 717/131 |
| 7,509,244 B1* | 3/2009 | Shakeri et al. | 717/140 |
| 7,853,937 B2* | 12/2010 | Janczewski | 717/149 |
| 2004/0194060 A1* | 9/2004 | Ousterhout et al. | 717/120 |
| 2005/0132374 A1* | 6/2005 | Flood et al. | 718/100 |
| 2008/0196027 A1* | 8/2008 | Hohmann et al. | 718/100 |
| 2009/0193427 A1* | 7/2009 | Pu et al. | 718/104 |

OTHER PUBLICATIONS

National Instruments: "LabVIEW: Ease of Use and Powerful Development." XP-002523933 Retrieved from internet: URL:http://web.archive.org/web/20080101122320/zone.ni.com/devzone/cda/tut/p/id/3589> [retrieved on Apr. 16, 2009].

\* cited by examiner

*Primary Examiner* — David H Malzahn
(74) *Attorney, Agent, or Firm* — Fish & Richardson P.C.

(57) ABSTRACT

One or more operations are defined to be used against a repository of one or more items. One or more associations between each of the one or more items are also defined. A classification is associated with the one or more operations for an execution environment within a transformation graph, wherein the classification defines whether the operation can be executed in parallel or not in parallel with other operations. The operations are processed based on the classification.

19 Claims, 5 Drawing Sheets

REPRESENTATION OF DATA TRANSFORMATION PROCESSES FOR PARALLELIZATION

BACKGROUND

The disclosure relates to information management.

Since the increase of microprocessor clock rates is slowing down, microprocessor manufacturers now also increase the number of processor cores in order to increase processing power. However, the potential of the additional cores can only be used for business applications if these applications are parallelizable, i.e., can be "divided" into parts that can be executed in parallel. Today, an application needs to be written in a specific way in order to take advantage of parallel processing threads. Writing an application for parallel execution is much more effort and requires special training.

SUMMARY

Disclosed herein are systems, apparatus and methods for providing a programming model and runtime architecture that can formulate data transformation (operation) processes in a form that allows the parallelization of the execution of these processes without requiring the programmer to write dedicated parallelization coding. In one implementation, one or more operations are defined to be used against a repository of one or more items. A classification is associated with the one or more operations within a transformation graph for an execution environment, wherein the classification defines whether the operation can be executed in parallel on separate subsets of an input data set or not. The operations are processed based on the classification.

In another implementation, a transformation graph is received, the transformation graph including one or operations, where the operations are parallelizable operations and non-parallelizable operations. The graph is cut into segments where each segment consists of a linear sequence of parallelizable operations, except for the last operation, which does not need to be parallelizable. At the execution time, these segments are split into a number of parallel identical segments, each processing a partition of the input data, where transformations are added to partition the input data at the beginning of the segment and merging the result at the end of the segment. Other implementations are disclosed which are directed to systems, methods and computer-readable mediums.

DETAILED DESCRIPTION

Figure 1:
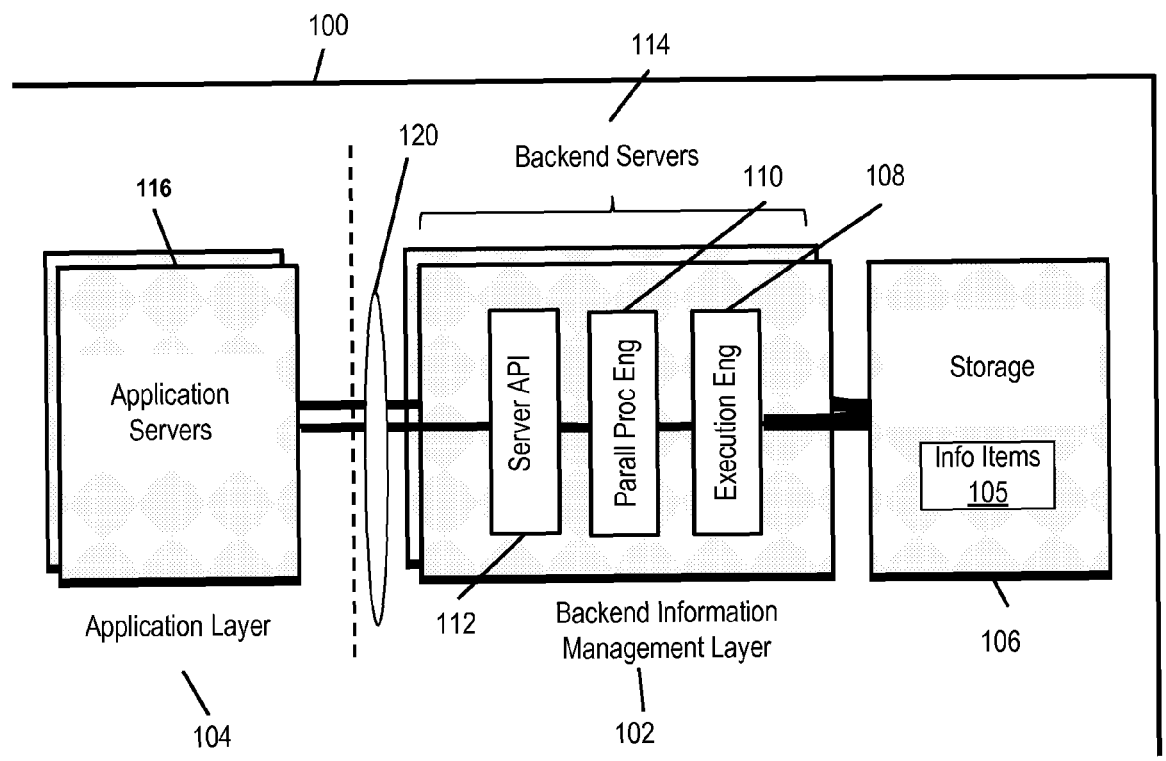
FIG. 1 is a block diagram of an implementation of an information management system.

FIG. 1 is a block diagram of an implementation of a system 100 that can be used to implement the invention. In one implementation, the information management system 100 can include a Backend Information Management Layer 102 providing data management and persistency functionality, and an Application Layer 104 hosting applications that make use of the information management system.

In one implementation, the Backend Information Management Layer 102 data can include a Storage 106. Info Items 105 and their Associations are stored in the storage module 106. Requests to the Server API 112 can be sent from the Application Server Layer 104 in the form of processing plans, i.e., transformation graphs, via the Server API 112. The parallel processing engine 110 can pick up these transformation graphs and tries to maximize their parallel execution. Application programs 116 that make use of the information management system's functionality can be deployed at the Application Layer 104 and can access a Backend Server instance via a stateless Server API. Due to this stateless API Backend Servers can be treated as resource pools where every server instance can handle every application request.

In one implementation, the actual processing of the (parallelized) transformation graph takes place in the execution engine 108 of the backend server instances 114. In one implementation, the application servers 116 contain the application logic and interact with the application programs. In one implementation, a separate UI layer can exist. In other implementations, the application servers 116 can also be invoked by web service calls. The application server 116 sends queries or processing requests to the backend server instance 114, in which the Server API 112 decodes the incoming message and constructs the corresponding transformation graph, the parallel processing engine 110 cuts the graph into segments, and dynamically parallelizes segments that are scheduled for execution. The execution engine 108 can execute the transformation chains in the individual working threads; it is decoupled from the parallelization. The execution engine 108 can fetch Info Items 105, associations and attributes from the storage 106 when needed.

In one implementation, the storage 106 can store the Info Items 105 which are collections of attributes and which play the role of data objects in a conventional database, and associations, which associate the Info Items 105 with each other. In one implementation, attributes associate Info Items with attribute values. The concepts of Info Items 105 and associations are explained in greater detail below. A set of Info Items 105 can, for example, either be defined by explicitly listing its elements or by describing the way it is created out of other sets, e.g., by filtering or set unification.

In one implementation, attributes or associations of Info Items 105 exist that are only valid within a specific context, e.g. for a specific version of an Info Item. In one implementation, a context can also be defined for an Info Item 105 set.

All processes, which are performed on the Info Items 105 and Associations, such as selecting, retrieving associated Items, filtering and attribute manipulation, can be represented as a graph, where the nodes are sets of Info Items 105 in a specific state and the edges represent transformations (operations). The set of operations that are needed to describe the data processing that is usually done in business applications are listed below.

A certain class of transformations, in the following called "directly parallelizable transformations" can be directly parallelized because if they are applied independently on partitions of a given input set, their output sets are disjunct and do not depend on a specific execution order.

Figure 3:
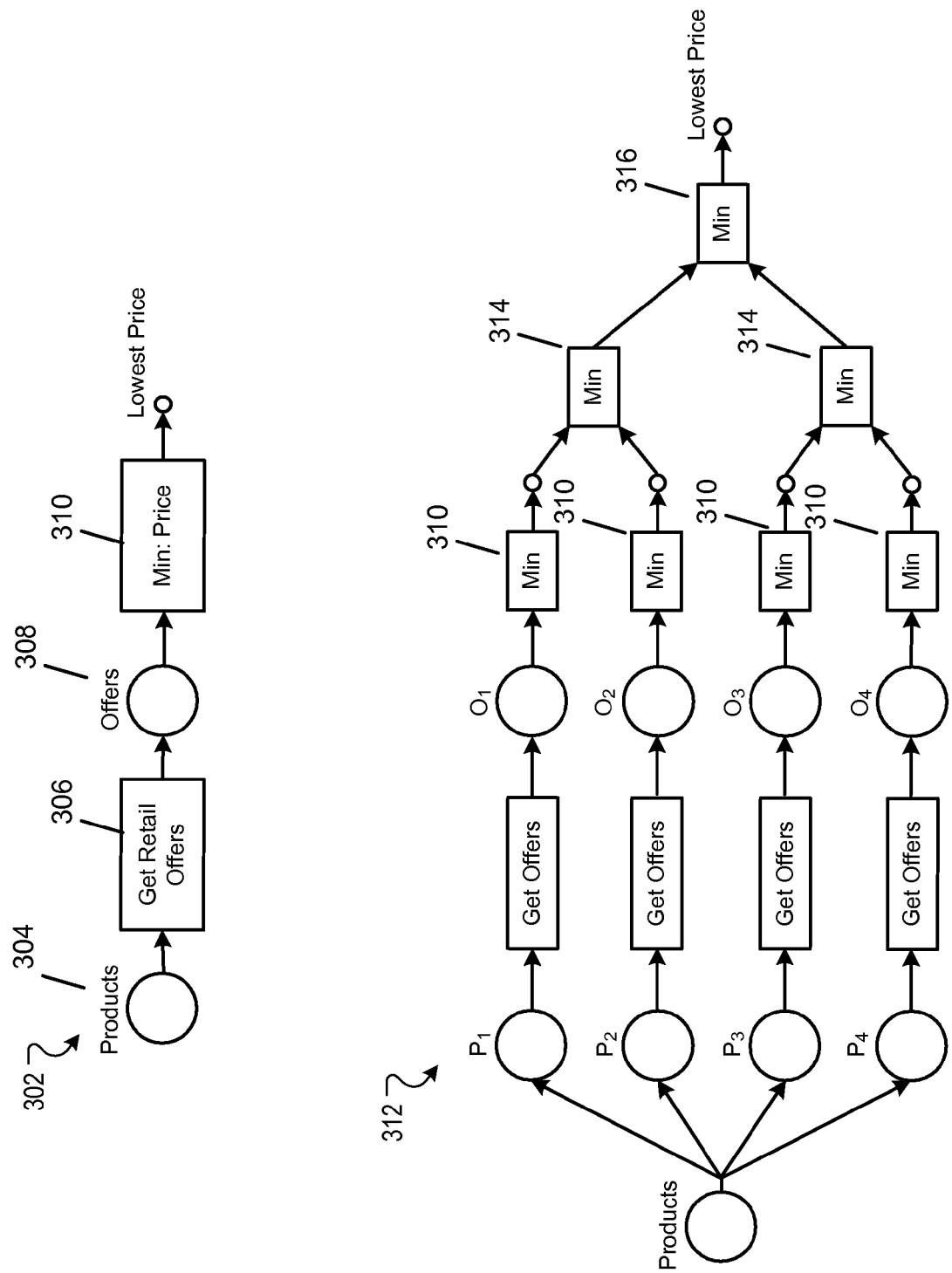
FIG. 3 displays a transformation graph before and after parallelization.

In a second class of transformations, in the following called non-directly parallelizable transformation, one Info Item 105 or Association in the result set can depend on more than one Info Item 105 or Association in the input set. Non-directly parallelizable transformations can be difficult to parallelize because splitting up the input set into several disjunctive subsets does not ensure that when the transformation is applied to each of the subsets individually, the corresponding output sets are disjunctive, too. Some non-directly parallelizable transformations can, however, be parallelized by applying a cascading strategy, e.g., calculating the minimum value of an attribute in a set of Info Items 105 can be performed even if the set is split up into subsets (as shown in FIG. 3).

In such a cascading, a transformation can first be applied to each of the subsets and then the result values of these subsets are used as input for the same transformation again until only one value is left. The cascading implementation can be different for different "cascadable" transformations, but it always is based on the concept to recursively run the transformation first on separate sets and then on the merged results.

In some implementations, a transformation takes as input a set of Info Items 105 and Associations and calculates a new set of Info Items 105 and Associations as its output. A "change transformation" can overwrite the input set with the output set in the persistent storage, or, to be more accurate, the output set is the new version of the input set.

A filtering transformation reduces a set to the sub-set of elements that fulfill given conditions in respect to type, associations or attribute values. The filtering transformation is not non-directly parallelizable.

The result of a union transformation is the set of all elements that occur in at least one of the input sets. A union operation may attach a contextual "number of occurrences" attribute to the elements of the result set. The union operation is non-directly parallelizable but can be cascaded.

The result of an intersection transformation is the set of all Info Items that are contained in both of the original sets. The intersection transformation is non-directly parallelizable because the question whether an element is part of the final set can only be evaluated after having processed both sets.

The subtraction transformation removes the contents of one set from another. It is non-directly parallelizable and cannot be cascaded.

The deriving associated Info Items 105 transformation retrieves all Info Items of a specified type that are related to one of the Info Items in the original set by a given association type. The operation is not non-directly parallelizable, but if performed on the subsets of a split set in parallel, it can result in overlapping output sets. When these output sets are merged again for further processing in a single thread, the overlappings must be eliminated.

The service call transformation calls a function or service, mapping specified attributes of a given Info Item or set of Info Items to the services input parameters. It is not non-directly parallelizable, but parallelization only makes sense if the service provider can perform load balancing.

The order transformation orders the Info Items 105 of a set corresponding to a given attribute, by adding "has predecessor" and "has successor" relations to the Info Items. These associations are only valid in the context of the set. An ordered set has a pointer to the first and last Info Item in the sequence. The order operation is non-directly parallelizable, but can be cascaded.

The aggregation transformation reduces a [composition] tree to a flat list of distinct Info Items 105 of a specified type. For example, all Info Items of the type "bolt" in a hierarchical bill of materials can be aggregated. The result would then be a list of the distinct bolt sizes used in the assembly which carry as contextual attributes the number of their occurrence in the tree or their aggregated quantity (if the associations making up the tree are marked with the corresponding quantity attributes and/or factors. The aggregation operation is non-directly parallelizable, but can be cascaded.

Numeric aggregators such as minimum, maximum, sum and average operations evaluate a specified attribute for all elements of a set and determine the minimal/maximal/average value or the sum over all values. These operations are non-directly parallelizable but can be cascaded.

The assignment transformation adds or overwrites an attribute value or provides a new association target. In the transformation graph, its output is a newer version of the Info Item that it manipulates. The assignment operation can be executed in parallel threads, if it is ensured that the value to be assigned is known before the forking.

An iterator describes the fact that a sequence of transformations is to be executed for each Info Item 105 in a set S individually; typically to perform a calculation and assign the result to an Info Item 105. In the transformation graph, the iterator has as output a node that represents a single entity of the set, which is available during the execution of the "iteration." The second output of the iterator is the modified set S', which is available after all elements of "S" have been processed, and which can then be connected to the further transformation graph. The transformation chain originating from an individual entity needs to stay isolated from the rest of the transformation graph since its nodes are only valid during the execution of the corresponding iterator thread, and it cannot be ensured that other nodes in the transformation graph are already available at that time. The transformation chain can, however, add Info Items to the result set S'. The Iterator is parallelizable if no assumptions about the processing position in the processing steps of the individual Info Items are made, in particular if no position variable is used for the calculations.

The grouping transformation separates a set of Info Items 105 into subsets containing each set of Info Items 105 with the same value for a specified attribute/association. The Grouping Operator works like the iterator, with the difference that the role of an individual Info Item in the case of the iterator operation is taken on here by a subset.

The common attributes transformation has as input a set of Info Items and as output the set of all attributes/associations the elements of the set have in common. The operation is non-directly parallelizable but can be cascaded.

In one implementation, a transformation that changes the value of an Info Item 105 attribute/association creates a new version of that Info Item 105. In the transformation graph 120, the Info Item 105 before and after such a change is two different nodes. That means that transformations can fork off both versions of the Info Item 105. Thus even if a transformation using the earlier version of an Info Item 105 is performed at a later point of time than the one creating the new version, the initial state is used, which means that the order of execution does not matter.

In one implementation, the information management system server 112 API offers classes for Info Items 105 and Sets of Info Items 105. The basic transformations listed above can be exposed as methods of (one of) the input parameters, e.g., transformations operating on sets are exposed as methods of the Set class. To the programmer it appears that he is performing sequential operations on actual in-memory instances of Info Items 105, although in the case of set operations on a coarse-grained level. In other words, the programming model allows the programmer to write sequential programs that then are executed in parallel by the execution environment based on its knowledge about the properties of the applied transformation operations.

In one implementation, when the transaction is committed or a command is submitted which requires the resolution of single Info Items 105 (e.g., for graphical display of the resulting Info Items in an application's GUI), the [query and] transformation graph 120 is passed to the execution engine 108, which executes it and sends back the corresponding result set.

In one implementation, when an application server 116 changes data, it checks whether the changed instances satisfy the selection criteria of a cached Info Item 105 set, and if so, sets an invalidation flag for that set. Although the query description does not need much space on the server, it will expire (and thus be removed) after a configurable time to avoid accumulation of obsolete versions.

In one implementation, when the client associated with the application servers 116 tries to write back changes on the cached data and the query is invalidated or expired on the server 114, it will receive a notification that the cached data on the client is invalid. The client implementation then retrieves the changed data (the query parameters have been stored) and compares it to the cached data. The server-side changes are then communicated to the application 116, which decides how to handle the situation.

In one implementation, a transformation graph 120 represents a data manipulation or query in a way that imposes as few constraints as possible on the sequence of execution.

For example, suppose a manufacturing company has a set of products, which consist partially of bought "atomic materials" and partially of parts that are manufactured or assembled from the atomic materials. For each product, there is a bill of materials, i.e., a composition tree, and a routing, i.e., a tree of manufacturing/assembly steps that are needed to transform the atomic materials into the finished product.

Figure 2:
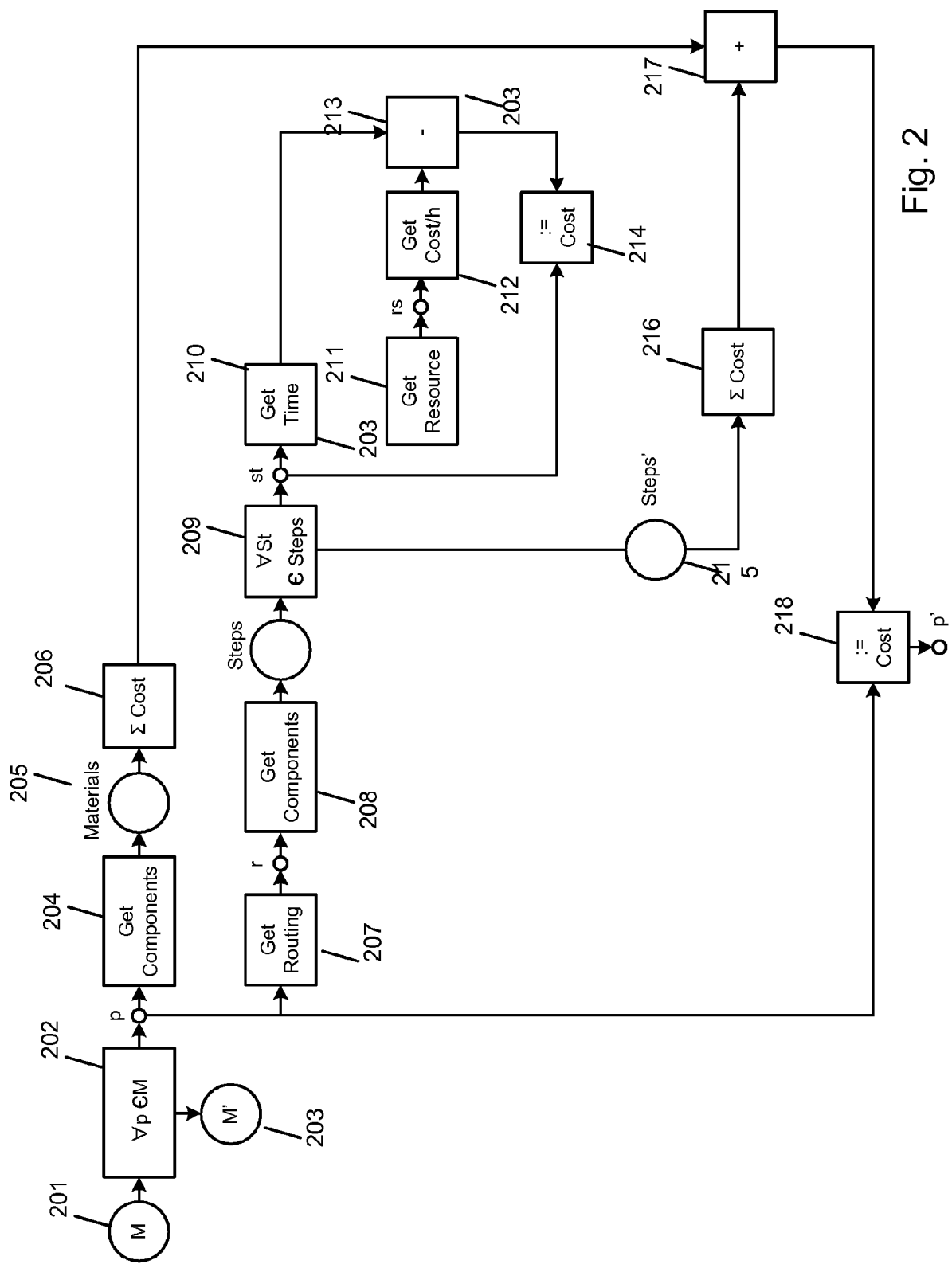
FIG. 2 is an example transformation graph.

FIG. 2 displays a transformation graph. Possible nodes of the transformation graph 200 are: Info Items 105, Sets of Info Items, Attribute values or target Info Items for Associations, and Transformations, as will be described in greater detail below.

The transformation nodes are annotated with information that is relevant for the parallelization, especially whether they are non-directly parallelizable or not. In one implementation, the technical representation of the transformation graph is optimized for execution, i.e., the client invests processing power to prepare the transformation graph in such a way that the server does not need to do extensive parsing or restructuring. The parallelization, however, is done by the information management system Backend Servers 114.

Each step in the routing has a duration and is assigned to a resource (i.e. a machine or assembly station), which performs the corresponding step and carries an attribute specifying the cost/hour. In order to evaluate the current cost of each product, the cost of all atomic materials needs to be aggregated. In addition to the material cost, the manufacturing/assembly cost needs to be calculated by multiplying the duration of each step with the cost per time unit of the associated resource and summing up these processing costs over the whole routing tree.

The transformation graph that the client implementation creates is displayed in FIG. 2. In this example, the transformation graph 200 starts with a set of materials M 201. The first transformation is an iterator 202 which creates a single task thread for each material p out of M and creates an output set M' 203 containing new versions p' of these materials.

Each of the task threads is split into three sub-graphs receiving the material p as input: The first one is a sequence of the two transformations "get components" 204 and "sum cost" 206, i.e. it calculates the total cost of all externally supplied components contained in the material p. The second sub-graph retrieves 207 the routing r associated with the material p, followed by the transformation "get components" 208, which yields the set of all steps contained in the routing. This set is processed by a second iterator 209, which calculates the processing cost of each step st and attaches it as attribute "cost" associated to st 214. In order to calculate the cost of step st, its "time" attribute is read 210, and also the associated get resource 211 is evaluated, from which then the "cost/h" attribute is read 212, then both values are multiplied 213.

When this subgraph has been executed for all steps st, the iterator 209 is finished and the resulting set of updated versions of the steps 215 is used as input for a transformation that sums up the "cost" attribute over all the steps 216. This aggregated processing cost is added to the cost of the externally supplied materials (the output of transformation 206) and the sum is assigned to the "cost" attribute of the material p 218.

FIG. 3 displays how a segment of a transformation graph 302 is parallelized. On the server side, the transformation graph 302, which already is an execution plan, is manipulated for parallel execution. The parallelization is prepared by splitting up set nodes 304, 306, and 308 that precede parallelizable (directly parallelizable) operations 310 in the graph 302 into several subsets. All the subsequent parallelizable operations and result nodes are then duplicated in the graph so that they can be assigned to parallel threads.

When a non-directly parallelizable transformation 310 is reached in the transformation graph 312, the results of the parallel threads are merged again into one set of Info Item 314 or the final Info Item 316 respectively. In many cases this can be done in the step itself, otherwise, the union is performed in a separate step before the execution of the non-directly parallelizable step 316. The merging can be optimized for large data sets by performing it as a cascade (or tree) of initially parallel merge steps.

In one implementation, the inputs and outputs of all transformations are sets. These sets are abstract descriptions at the beginning (i.e. their content is only defined by their position in the transformation graph) and get resolved (i.e. filled with Info Item instances) as the processing of the transformation graph goes along.

In one implementation, a scheduler module keeps a list of all nodes in the transformation graph and the assigned Info Item sets (when available). When all input sets of a transformation in the graph are available (i.e. resolved), the corresponding transformation is scheduled for execution by the next available thread. When the thread is finished, the scheduler module receives the result set and assigns it to the corresponding node in the graph.

Figure 4:
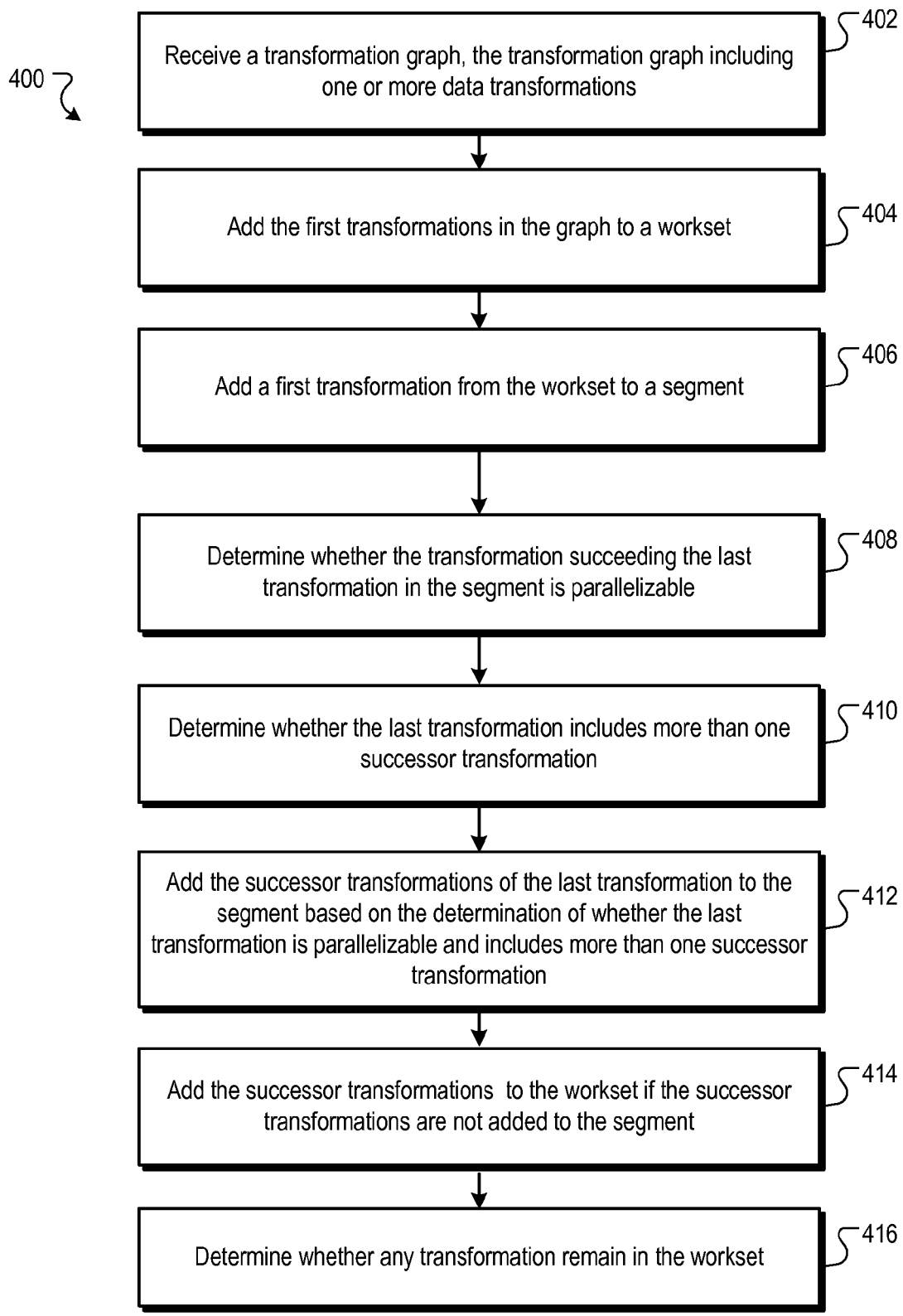
FIG. 4 is a flow diagram of an example process for processing a transformation graph.

FIG. 4 is a flow diagram of an example process 400 for processing a transformation graph. The process 400 can, for example, be implemented in a system such as the system 100 of FIG. 1.

Stage 402 receives a transformation graph, the transformation graph including one or more data transformations, where the transformations are directly parallelizable transformations and non-directly parallelizable transformations. For example, the server 112 can receive a transformation graph, the transformation graph including one or more data transformations, where the transformations are directly parallelizable transformations and non-directly parallelizable transformations.

Stage 404 adds the first transformations in the graph to a workset. For example, the parallel processing engine 110 can add the first transformations in the graph to a workset.

Stage 406 adds a first operation from the workset to a segment. For example, the parallel processing engine 110 can add a first operation from the workset to a segment. While the last operation in the segment is directly parallelizable, and has exactly one successor, the succeeding operation is added to the segment. The number of segments depends on the structure of the graph. It is also influenced by the number of starting points that are put in the working set. Therefore, it mainly depends on the number of starting points, bifurcations and non-directly parallelizable transformations in the graph.

Stage 408 determines whether the transformation succeeding the last transformation in the segment is parallelizable. For example, the parallel processing engine 110 can determine whether the transformation succeeding the last transformation in the segment is parallelizable.

Stage 410 determines whether the last transformation includes more than one successor transformation. For example, the parallel processing engine 110 can determine whether the last transformation includes more than one successor transformation.

Stage 412 adds the successor transformations of the last transformation to the segment based on the determination of whether the last transformation is directly parallelizable and includes more than one successor transformation. For example, the parallel processing engine 110 can add the successor transformations of the last transformation to the segment based on the determination of whether the last transformation is directly parallelizable and includes more than one successor transformation.

Stage 414 adds the successor transformations to the workset if the successor transformations are not added to the segment. For example, the parallel processing engine 110 can add the successor transformations to the workset if the successor transformations are not added to the segment.

Stage 416 determines whether any transformation remain in the workset. For example, the parallel processing engine 110 can determine whether any transformation remain in the workset. Stages 408-414 are repeated until no more transformations remain in the workset.

In one implementation, the individual segments can be fanned out by splitting the input set of the first operation. A dedicated transformation is added into the segment to perform the splitting. The number of individual copies of the segment is determined dynamically. This occurs at execution time.

In one implementation, once the input set has been split, one copy of the segment for each subset is executed. In the end, the results need to be merged again, with three possible scenarios.

First, the last operation in the segment is directly parallelizable. In this case, the result is merged set by adding a "unify" operation that picks up all the partial results of the working threads and unifies them in one set.

Second, the last operation in the segment is non-directly parallelizable, but cascadable. The merging and perform the operation can be done simultaneously, in a cascade of steps where with each step the number of output sets (and hence number of threads) is reduced. The cascade looks therefore like a tree lying on the side (see FIG. 3)

Third, the last operation is non-directly parallelizable and not cascadable: In that the "unify" transformation is inserted before the non-directly parallelizable operation, so that the latter operates on only one, unified, set of Info Items.

In one implementation, the system 100 can change the transformation graph 120 in order to find directly parallelizable segments and parallelize them. A work set containing the starting points of all segments that have not yet been processed can be used. Here work set refers to a set of nodes in the graph.

The processing can be as follows: a starting point (i.e. a graph node) is selected from the work set (and at the same time removed from that set) and the succeeding operations are added to the current segment until a non-directly parallelizable operation is reached. The current segment is then finished. The next node after the non-directly parallelizable operation is the starting point for another segment and therefore put into the work set.

Figure 5:
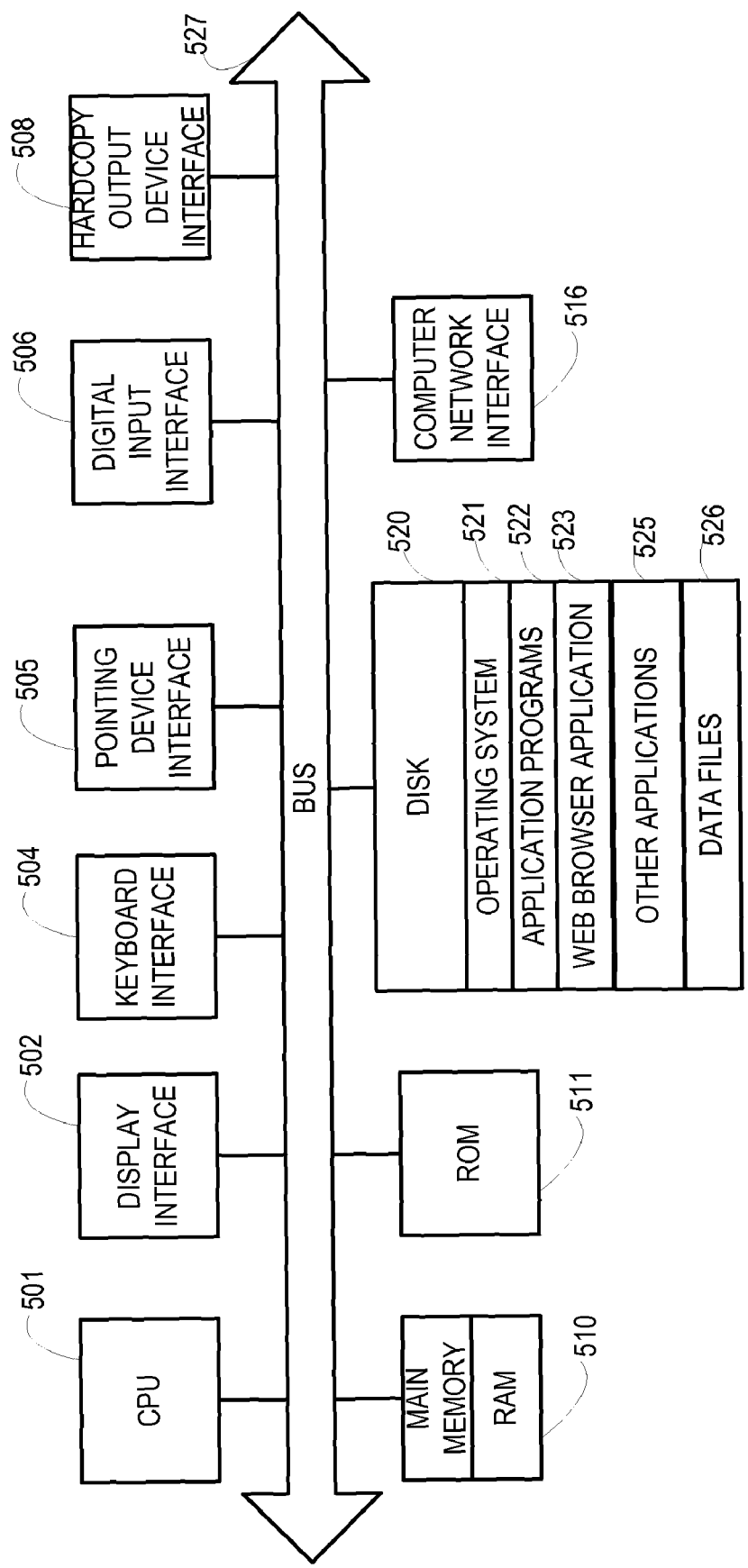
FIG. 5 is a schematic diagram of an example computer system that can be utilized to implement the systems and methods described herein.

FIG. 5 is a block diagram illustrating the internal architecture of an example computer system. The computing environment includes a computer central processing unit ("CPU") 501 where the computer instructions that comprise an operating system or an application are processed; a display interface 502 which provides a communication interface and processing functions for rendering graphics, images, and texts on a display monitor; a keyboard interface 504 which provides a communication interface to a keyboard; a pointing device interface 505 which provides a communication interface to a mouse or an equivalent pointing device; a digital input interface 506 which provides a communication interface to a video and audio detector; a hardcopy output device interface 508 which provides a communication interface to a hardcopy output device; a random access memory ("RAM") 510 where computer instructions and data are stored in a volatile memory device for processing by the computer CPU 501; a read-only memory ("ROM") 511 where invariant low-level systems code or data for basic system functions such as basic input and output ("I/O"), startup, or reception of keystrokes from a keyboard are stored in a non-volatile memory device; a storage 520 or other suitable type of memory (e.g. such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 521, application programs 522 (including web browser application 523, and other applications 525 as necessary) and data files 526 are stored; and a computer network interface 516 which provides a communication interface to a network over a computer network connection. The constituent devices and the computer CPU 501 communicate with each other over the computer bus 527.

The RAM 510 interfaces with the computer bus 527 so as to provide quick RAM storage to the computer CPU 501 during the execution of software programs such as the operating system application programs, and device drivers. More specifically, the computer CPU 501 loads computer-executable process steps from fixed disk drives or other media into a field of the RAM 510 in order to execute software programs. Data is stored in the RAM 510, where the data is accessed by the computer CPU 501 during execution.

Also shown in FIG. 5, the system 500 can store computer-executable code for an operating system 521, and application programs 522 such as word processing, spreadsheet, presentation, gaming, web browsing, JavaScript engine, or other applications.

The computer CPU 501 is one of a number of high-performance computer processors, including an INTEL or AMD processor, a POWERPC processor, a MIPS reduced instruction set computer ("RISC") processor, a SPARC processor, an ACORN RISC Machine ("ARM") architecture processor, a HP ALPHASERVER processor or a proprietary computer processor for a mainframe. In an additional arrangement, the computer CPU 501 is more than one processing unit, including a multiple CPU configuration found in high-performance workstations and servers, or a multiple scalable processing unit found in mainframes.

The operating system 521 may be APPLE MAC OS X for INTEL and POWERPC based workstations and servers; MICROSOFTWINDOWS NT®/WINDOWS 2000/WINDOWS XP Workstation; MICROSOFTWINDOWS VISTA/WINDOWS NT/WINDOWS 2000/WINDOWS XP Server; a variety of UNIX-flavored operating systems, including AIX for IBM workstations and servers, SUNOS for SUN workstations and servers, LINUX for INTEL CPU-based workstations and servers, HP UX WORKLOAD MANAGER for HP workstations and servers, IRIX for SGI workstations and servers, VAX/VMS for Digital Equipment Corporation computers, OPENVMS for HP ALPHASERVER-based computers; SYMBIAN OS, NEWTON, IPOD, WINDOWS MOBILE or WINDOWS CE, PALM, NOKIA OS ("NOS"), OSE, or EPOC for mobile devices, or a proprietary operating system for computers or embedded systems. The application development platform or framework for the operating system 521 may be: BINARY RUNTIME ENVIRONMENT FOR WIRELESS ("BREW"); Java Platform, Micro Edition ("Java ME") or Java 2 Platform, Micro Edition ("J2ME"); PYTHON™, FLASH LITE, or MICROSOFT .NET Compact.

While FIG. 5 illustrates one possible implementation of a computing system that executes program code, or program or process steps, configured to effectuate product authentication, other types of computers may also be used as well.

While the term "user" has been consistently used to describe an entity that interacts with these processes, such a generalization is also intended to describe multiple related or unrelated, living or automated entities or beings that interact with these processes at various different, overlapping or non-overlapping states. In a similar vein, the term "selection" is intended to denote throughout a manual selection by a human, an automatic selection by a non-human, or some combination thereof.

Finally, it is noted that, for the sake of brevity, the term "JavaScript" is intended to reference the SUN MICROSYSTEMS JAVASCRIPT programming language, and the term "XML" is intended to reference 'extensible Markup Language' throughout.

A number of implementations have been described. Nevertheless, it will be understood that various modifications may be made without departing from the spirit and scope of the disclosure. Accordingly, other implementations are within the scope of the following claims.

What is claimed is:

1. A method of representing data transformation processes for parallelization on an application server, comprising:
   (i) receiving, at the application server, a transformation graph, the transformation graph including one or more data transformations, where each data transformation is a parallelizable transformation or a non-parallelizable transformation;
   (ii) adding the one or more data transformations in the graph to a workset;
   (iii) adding a transformation from the workset to a segment to provide a segment transformation;
   (iv) determining whether the segment transformation is parallelizable;
   (v) determining whether the segment transformation includes more than one successor transformation; and
   (vi) adding the successor transformations of the segment transformation to the segment transformation in response to determining that the segment transformation is parallelizable and includes more than one successor transformation;
   (vii) adding the successor transformations to the workset in response to determining that the segment transformation is non-parallelizable or determining that the segment transformation does not include more than one successor transformation;
   (viii) determining whether at least one transformation remains in the workset; and
   (ix) repeating steps (iii)-(viii) for each transformation remaining in the workset in response to determining that at least one transformation remains in the workset.

2. The method of claim 1, further comprising:
   (x) creating one or more copies of the segment.

3. The method of claim 1, wherein adding the transformation in the workset to the segment comprises:
   determining whether the transformation has a predecessor; and
   adding the transformation in response to determining that the transformation has a predecessor.

4. The method of claim 1, wherein the segment transformation is non-parallelizable.

5. The method of claim 1, wherein all transformations but the segment transformation are parallelizable.

6. The method of claim 1, wherein the transformations are parallelizable.

7. The method of claim 1, wherein the transformations are non-parallelizable.

8. The method of claim 1, wherein each transformation can include an operation.

9. The method of claim 1, wherein the transformations can include at least one of a union, filtering, subtraction, intersection, order, aggregation, Numeric aggregators, assignment, grouping, common attributes, and a service call.

10. A system, comprising:
   a processor;
   a computer-readable medium coupled to the processor and having instructions stored thereon, which, when executed by the processor, causes the processor to perform operations comprising:
   (i) receiving, at an application server, a transformation graph, the transformation graph including one or more data transformations, where each data transformation is a parallelizable transformation or a non-parallelizable transformation;
   (ii) adding the one or more data transformations in the graph to a workset;
   (iii) adding a transformation from the workset to a segment to provide a segment transformation;
   (iv) determining whether the segment transformation is parallelizable;
   (v) determining whether the segment transformation includes more than one successor transformation; and
   (vi) adding the successor transformations of the segment transformation to the segment transformation in response to determining that the segment transformation is parallelizable and includes more than one successor transformation;
   (vii) adding the successor transformations to the workset in response to determining that the segment transformation is non-parallelizable or determining that the segment transformation does not include more than one successor transformation;
   (viii) determining whether at least one transformation remains in the workset; and (ix) repeating steps (iii)-(viii) for each transformation remaining in the workset in response to determining that at least one transformation remains in the workset.

11. The system of claim 10, further comprising operations including:

(x) creating one or more copies of the segment.

12. The system of claim 10, further comprising operations including:

determining whether the transformation in the workset has a predecessor; and adding the transformation in the workset to the segment in response to determining that the transformation has a predecessor.

13. The system of claim 10, wherein the segment transformation is non-parallelizable.

14. The system of claim 10, wherein all but the segment transformation are parallelizable.

15. The system of claim 10, wherein the transformations are parallelizable.

16. The system of claim 10, wherein the transformations are non-parallelizable.

17. The system of claim 10, wherein each transformation can include an operation.

18. The system of claim 10, wherein each transformation can include at least one of a union, filtering, subtraction, intersection, order, aggregation, Numeric aggregators, assignment, grouping, common attributes, and a service call.

19. A system, comprising:

one or more processors; and a computer-readable medium coupled to the one or more processors and having instructions stored thereon, which, when executed by the one or more processors cause the one or more processors to perform operations comprising:

defining a transformation graph including items and associations between the items, wherein the transformation graph includes nodes that include sets of items in a specific state and edges, where each edge represents an operation;

associating each operation as a parallelizable operation or a non-parallelizable operation; and processing the transformation graph according to the states of the items, the associations between the items, and whether each operation is parallelizable or non-parallelizable.

\* \* \* \* \*